United States Patent [19]

Smith

[11] Patent Number: 4,720,851

[45] Date of Patent: Jan. 19, 1988

[54] METER READER

[75] Inventor: William V. Smith, Memphis, Tenn.

[73] Assignee: Lectrolarm Custom Systems, Inc., Memphis, Tenn.

[21] Appl. No.: 758,693

[22] Filed: Jul. 25, 1985

[51] Int. Cl.$^4$ .................................. H04M 11/00
[52] U.S. Cl. ................................ 379/107; 340/870.02
[58] Field of Search .............. 179/2 R, 2 AM, 2 A; 379/107, 106, 92; 340/870.02

[56] References Cited

U.S. PATENT DOCUMENTS

| Re. 26,331 | 1/1968 | Brothman et al. ............. 179/2 AM |
| 2,007,669 | 7/1935 | Yates ............................... 179/2 AM |
| 3,274,584 | 9/1966 | Morgan et al. ................. 179/2 AM |
| 3,414,676 | 12/1968 | Long ............................... 179/2 AM |
| 3,474,434 | 10/1969 | Lindberg et al. . |
| 3,518,652 | 6/1970 | Dransfield et al. . |
| 3,551,597 | 12/1970 | Russell . |
| 3,778,795 | 12/1973 | Campman et al. . |
| 3,899,639 | 8/1975 | Cleveley et al. ............... 179/2 AM |
| 3,961,317 | 6/1976 | De Brem et al. . |
| 3,982,180 | 12/1974 | Vaiden . |
| 4,075,607 | 12/1978 | Abe . |
| 4,085,287 | 4/1978 | Kullmann et al. . |
| 4,207,557 | 6/1980 | Gilkeson et al. . |
| 4,208,653 | 6/1980 | Abe . |
| 4,218,737 | 8/1980 | Buscher et al. . |
| 4,296,411 | 10/1981 | Romanelli et al. . |
| 4,315,248 | 2/1982 | Ward . |
| 4,315,251 | 2/1982 | Robinson et al. . |
| 4,316,262 | 2/1982 | Mizuta et al. . |
| 4,336,447 | 6/1982 | Oguchi et al. . |
| 4,352,104 | 9/1982 | Mizuta et al. . |
| 4,394,540 | 7/1983 | Willis et al. .................... 179/2 AM |
| 4,399,510 | 8/1983 | Hicks . |
| 4,405,987 | 9/1983 | Spalti . |
| 4,415,853 | 11/1983 | Fisher . |
| 4,415,896 | 11/1983 | Allgood . |
| 4,442,320 | 4/1984 | James et al. . |
| 4,467,434 | 8/1984 | Hurley et al. . |
| 4,488,152 | 12/1984 | Arnason et al. . |
| 4,489,384 | 12/1984 | Hurley et al. . |
| 4,504,831 | 3/1985 | Jahr et al. . |
| 4,540,849 | 9/1985 | Oliver ............................ 179/2 AM |

OTHER PUBLICATIONS

Pipeline & Gas Journal, Oct. 1985, David J. Gestler and Peter J. Hanowich, "The TouchRead System", pp. 46–52.

Forbes, Jul. 29, 1985, Kelly Costigan, "Measure for Measure", pp. 136–137.

Primary Examiner—James L. Dwyer
Attorney, Agent, or Firm—Dickstein, Shapiro & Morin

[57] ABSTRACT

A method of and apparatus for remotely reading at least one of a plurality of utility meters at a subscriber's location using the subscriber's non-dedicated telephone communication line is disclosed in which the device is activated only during a certain time on a predetermined day of the month and only after a predetermined number of ring signals are detected on the subscriber's line. An identifying tone signal is generated at the central station and sent to the meter reader at the subscriber's location where it is detected and compared to a pre-set tone signal. Upon acceptance, the meter reader then sequentially reads a plurality of voltages which are produced by applying a pre-determined voltage to a plurality of contacts for each utility meter dial. The voltage applied to the contacts passes through a plurality of zener diodes of different values. The different voltages thus generated correspond to the consumption registered by the utility meter. After being read, they are then converted to standard DTMF tone signals and transmitted to the central station for storage.

44 Claims, 4 Drawing Figures

METER READER

BACKGROUND OF THE INVENTION

The present invention relates generally to the remote reading of utility meters by electronic means. More particularly, the present invention relates to a method of and a system for remotely reading the utility meters of a user by means of the non-dedicated telephone line connecting the utility user to the central telephone station, in response to a call initiated by equipment at the utility office.

As is common practice, utility companies supply services such as gas, electricity and water to customers who are generally at widely scattered locations. A meter is provided at the customer's location for registering the amount of services or consumption used by the customer. Periodically, usually once per month or every other month, a utility company employee must visit each customer's home or place of business, locate and read the meter, and record the reading. Such readings are utilized to determine the bill to be rendered to the customer. Frequently, in order for the meter reader to gain access to the meter, he must be admitted to the home or place of business where the meter is located, necessitating that the customer or someone else be present sent at the time the meter reader calls. In the absence of the customer or someone to allow the meter reader to gain access, a card is left to be filed in by the customer, or the meter reader must return later to again attempt to read the meter. That presents an inconvenience to the customer and also some peril since, with the constant changing of personnel, the customer cannot know whether it is safe to admit the meter reader, even though he may be wearing the uniform of the utility company.

In addition, a significant labor cost is involved in hiring personnel to read the meters. The task itself is onerous, requiring a great deal of walking on the part of the meter reader, the consumption of a large amount of time per meter read, and a great turnover of personnel. In addition, it is easy for meter readers to make a mistake and, thus, the bill rendered to the customer is inaccurate.

A considerable savings in labor costs can be realized if utility meters are read automatically and the information transmitted to the utility company office using non-dedicated telephone lines. The number of employees engaged in the task of reading meters could thus be substantially reduced. The onerous task of reading the meters would be reduced so that the turnover of personnel could also be decreased. Also, it would not be necessary for customers to be inconvenienced by having to admit a meter reader to the premises and the meters could thus be read on a pre-determined date each month thereby assuring that the reading represents true consumption.

Automatic meter readers are known for use in reading utility meters and for transmitting that reading to the utility company office. However, such apparatus has not been widely accepted because it has involved considerable modification to existing meters, was complex, had a high probable cost of maintenance, and because the apparatus itself and its installation necessitated high costs.

Many of the systems proposed for automatically reading meters from a remote location have involved using existing common non-dedicated, telephone lines as the communications medium for transferring the meter information. Such systems have involved obtaining the information in response to a telephone call initiated by apparatus at the central telephone station. The main advantage of using such non-dedicated telephone lines is that the installation of additional communication lines is unnecessary. The greatest benefit of transferring the meter reading to apparatus at the central station pursuant to a call made by that apparatus is that a complex telephone answering system is not required at the collecting station in order to insure that all incoming calls will be answered in an orderly and efficient manner. Another advantage is that such a system does not involve the use of selectively operable automatic dialing devices at each one of the locations containing the utility meters which are to be read. However, one of the problems with such systems has been the unavoidable ringing of the telephone at the subscriber station pursuant to the call initiated by the apparatus at the central station. In order to avoid that nuisance to the subscriber, a number of different techniques have been suggested.

One such technique involves the use of special telephone company line test circuits which do not activate the bell in the telephone at the subscriber's station for connecting the collecting apparatus at the central station with the subscriber's station. One of the problems of that technique is that it requires the installation of additional equipment at the telephone company's central office. In addition, in order to use such technique, approval from the telephone company must be obtained. A system employing that technique is described in U.S. Pat. No. Re. 26,331, reissued on Jan. 9, 1968, to Brothman, on original U.S. Pat. No. 3,142,726, dated July 28, 1964.

Another technique requires disconnecting the subscriber's telephone from the telephone lines for a certain period of time each day during which time the telephone wires are connected directly to a meter reading device which itself is connected to the utility meters during that time period. In response to an incoming call, the meter reading device transmits the meter data. One problem with this type of scheme is that normal telephone service is completely disrupted for that time period. An additional problem with such an arrangement is that all incoming calls made during that particular time period, including calls made by parties other than the collecting station, will be connected to and answered by the meter reading device. After the meter reading device answers the call, the meter data will be sent out over the telephone lines, without regard to whether the incoming call is from the collecting station. An example of that type of device is disclosed in U.S. Pat. No. 4,126,762, issued on Nov. 21, 1978, to Martin et al.

A similar technique is disclosed in U.S. Pat. No. 4,394,540, issued July 19, 1983 to Willis, et al. The device disclosed therein is a remote meter reader and a method for reading meters over non-dedicated telephone lines in which apparatus present at the telephone subscriber's station responds to interrogation by the central office and transmits meter data thereto over non-dedicated telephone lines.

Each day, the telephone is isolated from the telephone lines for a predetermined data access time. Any call made to the subscriber station during that data access time is answered by the meter reader. In order to determine the source of the call, a coded signal is sent out over the telephone lines by the central office. In the event that the call is from the central office, a coded reply signal is sent back, and the meter reader transmits the data to the central office. If the coded reply signal is not returned, the meter reader generates ringing signals for activating the bell in the subscriber's telephone.

While such a system may overcome some of the disadvantages present in prior art systems, it still retains many of those disadvantages. For example, like earlier prior art devices, the telephone is isolated from the telephone lines for a predetermined data access time each day. Although means have been provided for determining if an incoming call is from the central office, such apparatus requires the use of an on-board microprocessor and other additional complex circuitry. Thus, such an arrangement necessitates increased costs and potential operational failures. In addition, the call from the central office must be closely timed to coincide with the predetermined data access time of each subscriber's station. Otherwise, the meter reader will not be accessible to the central station. Such apparatus is obviously complex and costly.

SUMMARY AND OBJECTS OF THE INVENTION

In view of the foregoing, it should be apparent that there still exists a need in the art for a method of and apparatus for remotely reading utility meters over non-dedicated telephone lines in which electronic means are utilized in a simple and precise manner to accomplish the reading with no interruption of telephone service to the utility subscriber. It is, therefore, a primary object of this invention to provide a method of and apparatus for remotely reading utility meters over non-dedicated telephone lines which is characterized by simple electronic circuitry and which has particular application for electric, gas and water meter reading apparatus.

More particularly, it is an object of this invention to provide remote meter reading apparatus as aforementioned having simple and reliable electronic circuitry which does not require frequent maintenance nor costly components.

Still more particularly, it is an object of this invention to provide remote meter reading apparatus which utilizes the subscriber's standard telephone equipment without modification and without interrupting the subscriber's normal service.

Another object of the present invention is to provide reliable and relatively inexpensive meter reading circuitry such that utility meters can be read over existing non-dedicated telephone lines.

A further object of the present invention is to provide apparatus for remotely reading utility meters in which the required modifications to the meters can be made quickly, simply and inexpensively at the subscriber's location.

It is still yet another object of the present invention to provide a remote meter reading apparatus which is capable of sending a message to the collection apparatus at the time of reading the utility meter indicating that the meter has been tampered with.

Briefly described, these and other objects of the invention are accomplished in accordance with its apparatus aspects by providing electronic circuitry which answers an incoming telephone call only on a certain pre-selected day and only after a predetermined number of rings. If the call is from the central computer at the utility company, the inventive meter reading circuitry will interrogate the meter and transmit the results, using standard DTMF signals, back to the computer. The meter reader will then be incapable of responding to a telephone call from the central utility office until one month later unless the telephone is answered by the subscriber. The restriction as to one day per month is only applicable when the meter reader answers the telephone call.

More specifically, once the meter reader circuitry has been activated, it then sequentially reads a plurality of voltages which are indicative of the consumption registered by the utility meter. An adapter is attached to the dial face of the utility meter and contains a plurality of holes through which each respective one of the plurality of dial shafts of the utility meter pass through, and a plurality of contacts surround each hole. A pointer having a contact for connecting each of the plurality of contacts to ground is used on each dial shaft. A plurality of diodes may be connected, one to each contact, to receive the pre-determined voltage. Since each of those diodes is of a different value, the different voltages thus generated uniquely correspond to the consumption registered by the utility meter. After those voltages are read, they are converted to standard DTMF tone signals and are then transmitted to the central collecting station.

DETAILED DESCRIPTION OF THE EMBODIMENT

Figure 1:
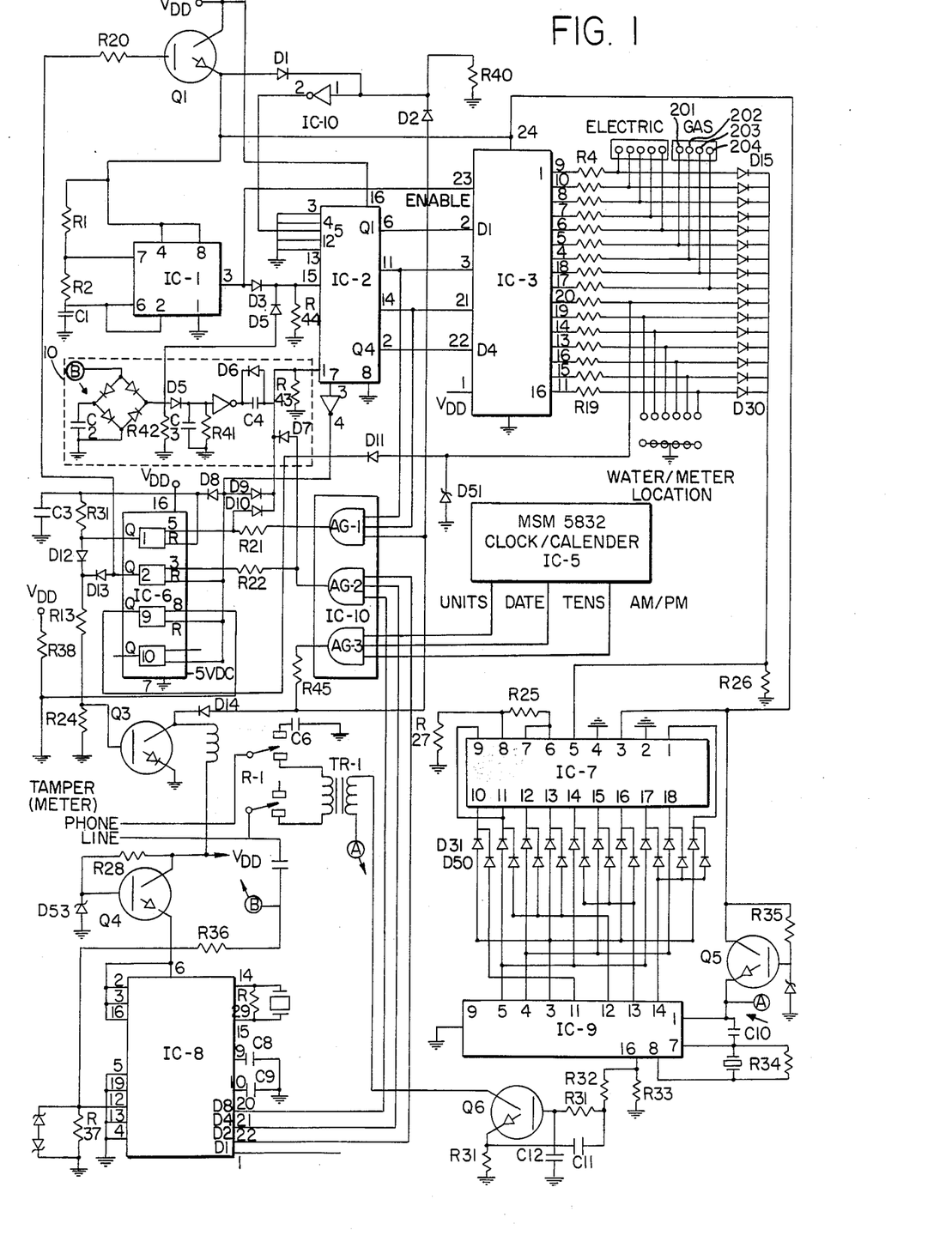
FIG. 1 is an electrical schematic diagram showing implementation of a preferred embodiment of the electrical circuitry of the present invention.

Referring now to FIG. 1, there is shown in electrical schematic diagram form, a preferred embodiment of the instant remote meter reader. The incoming subscriber's telephone line is connected to the center contacts of a double pole, single throw relay R-1 and, to an input of a diode bridge which forms part of the circuitry of a ring detector 10. The purpose of the ring detector 10 is to monitor the subscriber's telephone line to determine a ring signal thereon. The remote meter reader of the present invention is connected in series with the subscriber's telephone, in the same manner as an extension telephone.

Each time the ring detector 10 detects a ring voltage on the subscriber's line, a signal is applied to pin 15 of an up/down binary coded decimal (B.C.D.) counter IC-2. The application of each signal to pin 15 causes the output of IC-2 to count up by one from zero, in B.C.D. Four bits representing the current count are output simultaneously at pins Q-1 thru Q-4. After the sixth ring, the bits from pins Q-2 and Q-3 are high. Those high logic level signals are applied to two of the three inputs of a first AND gate AG-1 of a triple three input AND gate chip IC-10. The up/down B.C.D. counter may be a 4029 chip, while the triple three input AND gate IC-10 may be a CD 4073 chip.

All three inputs of AND gate AG-1 must be at a high logic level in order to produce an output. Since the remote meter reader disclosed herein is designed to normally be responsive to interrogation by apparatus located remotely therefrom, for example, the utility office, at only during a select day for each month, and during only the AM or PM hours, a clock/calendar chip IC-5, which may be an MSM 5832 chip, is utilized to provide a third high logic level input to that first AND gate AG-1 only during the selected time period. Thus, a third AND gate AG-3 contained on the triple three input AND gate chip IC-10, has as its inputs the units and tens output from the clock/calendar chip IC-5 as well as the AM/PM output of IC-5. During the preselected time, each of those outputs will produce a high logic level which is fed to a respective one of each of the three inputs of the AND gate AG-3. The output from the AND gate AG-3 is fed to the third input of the first AND gate AG-1, as well as, after passing through an inverter also contained on the IC-10 chip, to pin 5 of the B.C.D. counter chip IC-2.

Since the remote meter reader of the present invention is designed to answer after a preselected number of detected rings on the subscriber's telephone line, when all of the foregoing conditions occur, the AND gate AG-1 will produce an output which is fed to a first RS latch Q-1 contained on an RS latch chip IC-6. That IC-6 device may be, for example, a CD 4043 chip, or equivalent. The output from the first AND gate AG-1 is fed to the set terminal of the Q-1 RS latch, as well as to pin 1 of the B.C.D. counter IC-2.

When the RS latch Q-1 is set, it produces an output which causes transistor Q-3 to turn on, as well as resetting the latch Q-1. The turning on of transistor Q-3 causes the establishment of a voice path from the remote meter reader to the subscriber's line. In addition, the output from the dual tone encoder IC-9 is connected across the telephone line. That is accomplished because, when the RS latch Q-1 goes high, it causes transistor Q-3 to conduct voltage $V_{DD}$ to ground, thus actuating the coil of the relay R-1, which connects the incoming tip and ring lines to the lower terminals of the relay such that the incoming telephone line is connected to output pin 16 of IC-9 through transformer TR-1. The relay R-1 is held open only as long as the high level output from the RS latch Q-1 is applied to the base of Q-3.

One of the subscriber's tip or ring lines is coupled through a capacitor and a resistor R-36 to input pin 12 of a DTMF receiver chip IC-8. That chip may preferably be an SSI 204 device. It is used to establish that the remote meter reader has been properly interrogated by the equipment at the central station.

Once the utility equipment has dialed the subscriber's telephone number, it transmits a DTMF tone signal which, when received by the DTMF receiver IC-8, will actuate the remote meter reader of the present invention to actually read the desired utility meter. It should be understood that the remote meter reader of the present invention is capable of reading at least four different utility meters.

The transmission of an appropriate inquiry tone from the equipment at the utility office, when detected at DTMF receiver IC-8, will cause the outputs D8, D4, and D2 of DTMF receiver IC-8 to go to a high level logic. Since those three output pins are each connected to a respective input of the second AND gate AG-2 contained on chip IC-10, AND gate AG-2 will produce an output when the DTMF receiver IC-8 has determined that the correct frequency has been transmitted from the utility office in order to begin interrogation of the utility meters connected to the remote meter reader of the present invention. Four different tones can be processed and acknowledged by the DTMF receiver IC-8.

The output from AND gate AG-2 sets a second RS latch Q2 on the latch chip IC-6. The output of RS latch Q2 is connected to the base of a transistor Q1 which is turned on to apply voltage $V_{DD}$ to a timer IC-1 and a line decoder IC-3. The timer IC-1 may preferably be a 555 integrated circuit. The output pin 3 of the timer IC-1 is connected to both the input pin 15 of the B.C.D. counter IC-2 and the enable pin 23 of a four bit 4-to-16 line decoder chip IC-3. That decoder chip IC-3 may preferably be a 4514 integrated circuit.

The output from RS latch Q2 is also applied to the base of transistor Q3 which causes it to maintain relay R-1 in its lower position such that the remote meter reader of the present invention is connected across the subscriber's telephone line while the utility meters are interrogated. When the contacts of relay R-1 are in their second or lower position, they are connected through a matching transformer TR-1 to the output of a dual tone encoder chip IC-9, which may preferably be a number MK 5087 chip. It should be understood that both DTMF receiver chip IC-8 and dual tone encoder chip IC-9 utilize an individual crystal designed to oscillate at a frequency of 3.5795 MHz in order to produce the appropriate dual tone frequencies. It should further be understood that such frequencies produced by such chips are the standard DTMF signals utilized by telephone companies in connection with push-button telephones.

Each time the clock IC-1 outputs a timing pulse, it is applied to both pin 15 of IC-2 and pin 23 of IC-3. The positive portion of the timing pulse causes the B.C.D. counter IC-2 to output appropriate signals from output pins Q1–Q4, counting from zero through 15 in binary coded decimal, while the negative portion of the timing pulse, following the positive pulse, causes IC-3 to enable each output pin of IC-3 in turn.

Output pins Q1–Q4 are connected respectively to input pins D1–D4 of the four bit 4-to-16 line decoder IC-3. Thus, with each clock output from timer IC-1, B.C.D. counter IC-2 produces a B.C.D. representation of numbers 0 through 15 at terminals Q1–Q4 which is read at terminals D1–D4 of line decoder IC-3 such that the line decoder IC-3 is caused to count up from one to sixteen. Each of the pins 4–11 and 13–20 are connected through a respective resistor R-4–R-19 to one of a respective plurality of diodes D-15–D-30, each of whose cathode is connected to input pin 5 of a dot/bar display driver chip IC-7, which may preferably be a number LM-3914 device. As will be described hereinafter, the outputs from the utility meters are connected respectively between each resistor and series-connected diode to each of the pins 4–11 and 13–19 of line decoder IC-3.

Pin 20 has a resistor R-13 connected in series to a diode D-24 in the same manner as each of the other pins described above, however, no output lead from a utility meter is connected between that resistor and series-connected diode. Instead, as will be discussed hereinafter, the interconnection of resistor R-13 and diode D-24 is connected to circuitry for determining whether a utility meter has been tampered with, indicating that the meter reading of that utility meter will not yield an accurate result.

Figure 2A:
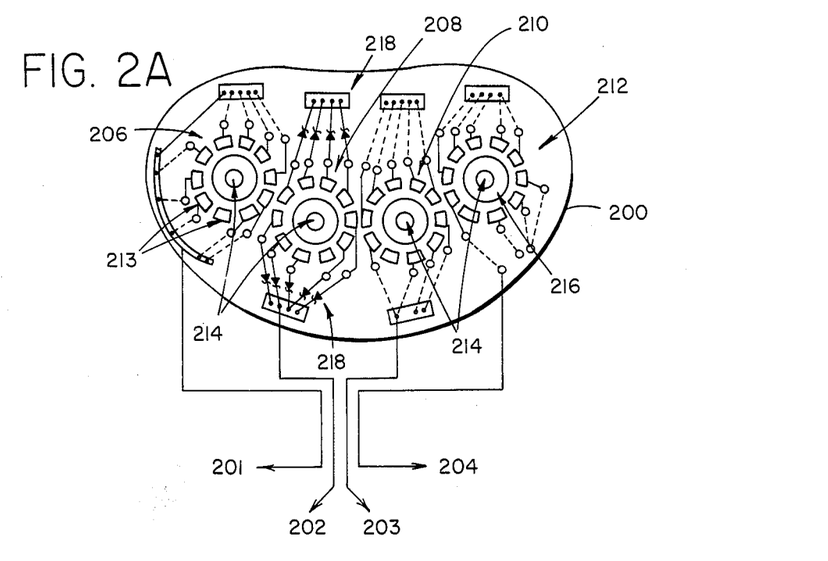
FIG. 2A is a schematic diagram of the bottom view of an adapter to be used in conjunction with a utility meter.
Figure 2B:
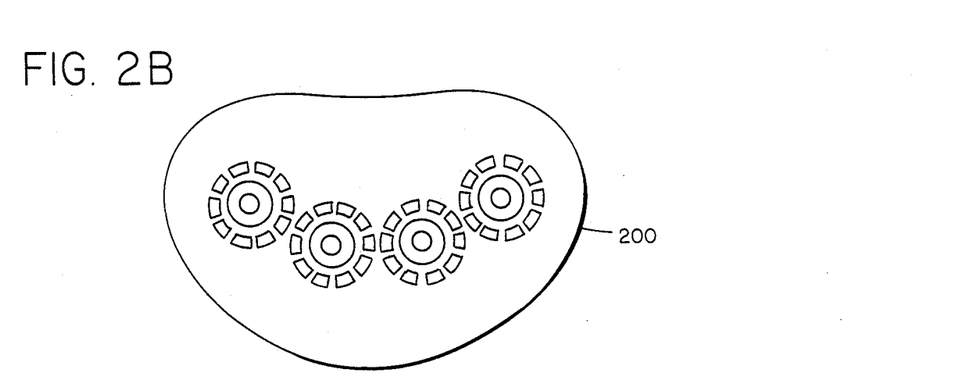
FIG. 2B is a schematic diagram of a top view of the adapter shown in FIG. 2A.

Referring now to FIGS. 2A and 2B, there is shown therein an adaptor 200 for use with a utility meter having four clock-like dials. It should be understood, however, that the adapter 200 can be constructed so as to contain any necessary number of dials. For example, while utility meters designed to measure gas consumption may have four clock-like dials, electric meters generally use five such dials. It should also be understood that the shape of the adapter 200 is appropriately designed to have the shape of the dial plate of the meter it is to be used with.

The meter adapter 200 contains a plurality of dial adapters 206, 208, 210 and 212. Each dial adapter is constructed of a plurality of dial segments or contacts, as determined by the utility meter with which the adapter is to be used. If necessary, the adaptor 200 could be comprised of a number of individual dial adaptors for application to a meter whose dials are not all in the same plane. In the embodiment shown, there are ten such identical segments, of which element 213 is a representative one. Each of the segments is appropriately designed to correspond to a position of the pointer of the utility meter, covering numbers 0 through 9. However, other numbers, such as 0 through 5, could also be used, although, in that instance, each dial adapter would contain 6 segments, each corresponding to one number from 0 through 5.

Each of the segments 213 is connected to a common point, except that segment which represents 0. Thus, a single lead 201–204 is used for connection from each dial to the remote meter reader circuitry described herein, between the appropriate resistor and series-connected diode.

The adapter plate 200 is designed to fit over the shafts of the existing meter dials, after removal of the pointers. Holes 214 are provided for that purpose. The original pointer used by the now-adapted utility meter is discarded and new pointers 300 are mounted on each of the shafts and serve as the means for electrically connecting the contacts 213 to ground. Alternatively, the holes 214 may be of a "keyhole" shape such that it is not necessary to remove the existing pointers. In that instance, the new pointers are connected over the existing pointers.

Figure 3:
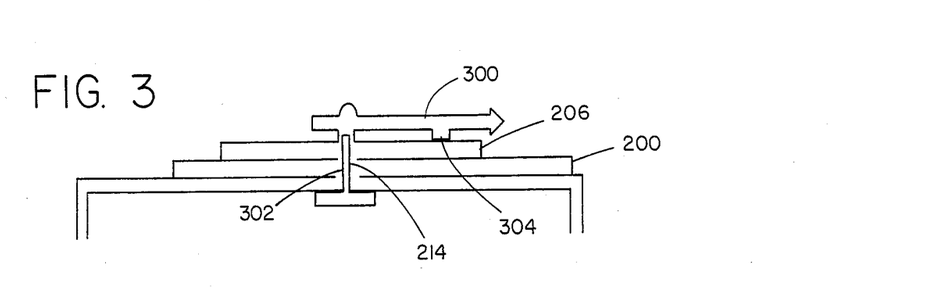
FIG. 3 is a diagram showing a side view of the adapter of FIG. 2 mounted to an existing utility meter.

As shown in FIGS. 2A and 3, the pointer 300 is mounted on the existing utility meter shaft 302. The adapter plate includes an inner contact 216 which is electrically connected to the pointer 300 and also to an electrical ground. The pointer 300 includes a contact 304 which, as the pointer 300 is rotated by the utility consumption, sequentially contacts each of the plurality of contacts 213.

As shown in FIG. 2A, each of the segments 213 (except that representing "0") is connected to a different one of a plurality of zener diodes 218, each having a different value. Thus, when the pointer 300 makes contact with each segment 213, a discrete voltage is produced at the respective output line connected to the decoder IC-3. The following are the values for each of the plurality of zenar diodes 218, with the meta value in parentheses: (1) 1.5 v, (2) 3.6 v, (3) 5.1 v, (4) 6.8 v, (5) 8.7 v, (6) 10 v, (7) 12 v, (8) 13 v, and (9) 15 v. Since there is no zener diode connected to the segment representing "0", the voltage appearing at the appropriate IC-3 output line will be approximately $V_{DD}=18$ v.

The zener diode voltage values are chosen such that, after subtracting the voltage loss across the diodes D-15–D-30, the resulting voltage input to pin 5 of IC-7 corresponds to the output from IC-7 necessary to produce the corresponding standard DTMF signal from DTMF generator IC-9. Thus, the digit to which the dial of the electric meter is pointing will produce a short-circuit condition between the appropriate resistor and series connected diode, through the respective zener diode 213. Therefore, when the line containing that short circuit is read by the line decoder IC-3, it will detect a voltage drop from $V_{DD}=18$ v on that line. The voltage drop on each line is fed, in a sequential manner, mirroring the sequential reading of the output pins of line decoder IC-3, to pin 5 of the dot/bar display driver IC-7.

The dot/bar display driver IC-7 is used to drive the dual tone encoder IC-9 such that an appropriate frequency signal is generated at output pins 1 and 16 for feeding through transformer TR-1 to the subscriber's telephone line. If the pointer 300 is between 2 dial segments, the lower number will be read since the lower voltage level produced by the lower voltage zener diode 213 will appear at the appropriate resistor-diode junction. It should be understood that resistors, diodes, capacitors or any other electrical component can be utilized in order to produce the different voltage levels for each meter, in place of the zener diodes 213. Obviously, where capacitors are so used, the time constant which results from charging up the capacitor is utilized in place of the voltage levels as the unit of measurement.

As previously described, pin 20 of IC-3 is utilized by the present remote meter reader circuitry to provide a signal to the central computer that a utility meter has been tampered with. The meter tampered circuitry utilizes one of the four RS latches on latch chip IC-6, latch Q-9. The set terminal of that latch is normally held at ground potential, that is, it is set low. However, that input is also connected through a resistor R-38 to the $V_{DD}$. In the event that the ground is removed from the meter, such as by disconnecting the meter, the connection to the power supply of 18 v through resistor R-38 causes the output of the latch Q-9 to go high which causes a high signal to appear at pin 20 of the decoder chip, IC-3. Therefore, an appropriate signal will be read, in the embodiment shown, as the tenth tone received by the equipment at the central station. If that tone represents a high level, the equipment at the utility office will be informed that the utility meter has been tampered with.

Although IC-5 pin numbers 11 through 16 can be connected as shown in FIG. 1 to a water meter, or other utility meter, there being six inputs provided therefore, it is also possible and under certain circumstances may be desirable, to utilize those inputs as a code for the subscriber's location. Thus, a discrete voltage would always be applied to each of those pins such that, the last six tones would uniquely indicate the subscriber location. Furthermore, inasmuch as has been previously described, the DTMF receiver IC-8 is capable of recognizing and distinguishing between four different input tone frequencies A-D received from the central station, it is possible to uniquely address a very large number of subscribers.

After the BCD counter IC-2 has counted from 0 through 15, in BCD form, an output appears on pin 7 which is inverted and is applied to each reset input of each of the RS latches contained on the RS latch chip IC-6. That causes the remote meter reader to terminate the connection to it from the central office.

In the event that a subscriber answers the telephone call from the central office, a statement such as "meter reader" will be heard by the subscriber followed by one of four tones to be recognized by the DTMF receiver IC-8. Inasmuch as the entire process of remotely reading the subscriber's utility meters using the remote meter reader of the present invention is completed within a matter of seconds, there is very little, if any, inconvenience to the subscriber. In addition, if the subscriber should hang up upon hearing the words "meter reader" the remote meter reader of the present invention will still continue to respond and to provide the utility office equipment with the meter readings, as if the subscriber had not answered the telephone at all.

The output from DTMF tone encoder IC-9 is applied from output pin 16 through transistor Q6, which functions as an amplifier, across matching transformer TR-1 and then onto the subscriber's telephone line.

In the event that an incoming call is detected by the remote meter reader of the present invention, that is, the remote meter reader answers the subscriber's telephone call after six (or any preselected number) rings, and no tone or the incorrect tone is received from the utility office, the time constant of resistor R-35 and capacitor C-5 is such that the remote meter reader will disconnect from the subscriber's line after a predetermined short period of time. When the ringing ceases, a pulse is produced which resets BCD counter IC-2 back to 0.

There has thus been described a remote meter reader which will continue to function over a period of years and which will always provide an accurate indication as to the amount of utility consumed as indicated by the utility meter. Furthermore, since there is no electronic memory utilized to either read or store the consumption indicated by the utility meter, the remote meter reader device of the present invention will continue to provide an accurate indication of the utility consumption without fear of a power failure due to battery failure, strong magnetic field or other electrical disturbance in the vicinity of the meter or the meter reading apparatus. Also, since the subscriber's line must have a predetermined number of rings on it before the utility can access the inventive meter reader, the subscriber will know when the phone line is being accessed.

Although only a preferred embodiment is specifically illustrated and described herein, it will be appreciated that many modifications and variations of the present invention are possible in light of above teachings and within the purview of the appended claims without departing from the spirit and intended scope of the invention.

What is claimed is:

1. A method of remotely reading at least one utility meter of a subscriber using telephone communication lines, comprising the steps of:
    dialing the telephone number of said subscriber;
    detecting the occurrence of a predetermined number of ring signals at the subscriber location;
    transmitting one of a plurality of coded tones to circuitry connected in parallel across the subscriber's telephone communication line;
    detecting if said one of a plurality of transmitted tones matches a predetermined tone after detecting the occurrence of a predetermined number of ring signals;
    sequentially reading voltages corresponding to the consumption recorded by said at least one utility meter upon detecting that said one of a plurality of transmitted tones matches the predetermined tone; and
    transmitting said sequentially read voltages over said subscriber's telephone communication line.

2. Apparatus for the remote reading of at least one dial of at least one utility meter of a subscriber using the subscriber's telephone communication line, comprising:
    means connected to the telephone communication line of the subscriber for detecting the occurrence of a predetermined number of ring signals on the subscriber's line and for producing a first enabling indicative thereof;
    means for receiving a plurality of tone signals and and for comparing a received tone to a predetermined tone signal; said means for receiving being connected in parallel across said subscriber's telephone communication line;
    means for producing a second enabling signal upon receiving a predetermined tone;
    means connected to receive said first and second enabling signals for actuating means for sequentially reading voltages corresponding to conmsumption recorded by said at least one utility meter;
    means for transmitting said sequentially read voltages over said subscriber's telephone communication lines for receipt at a remote location; and
    adapter means mounted to said at least one utility meter to be read, said adapter means comprising:
    a plurality of contacts associated with each dial of said utility meter;
    each of said plurality of contacts associated with each dial being coupled to be sequentially read; and
    voltage varying means coupled between all but one of said plurality of contacts and said means for sequentially reading voltages, such that a voltage is generated for each dial of said utility meter.

3. The apparatus of claim 2, wherein said voltage generated for each dial corresponds to the consumption registered by said dial.

4. The apparatus of claim 2, wherein each dial includes a shaft and said adapter means mounts to said utility meter such that the shaft of each of the utility meter dials protrudes through holes surrounded by said plurality of contacts.

5. The apparatus of claim 4, wherein said adapter further comprises pointer means mounted to said dial shaft above said adapter means, said pointer having means for connecting one of said plurality of contacts to ground when said pointer is positioned over said contact.

6. The apparatus of claim 2, wherein said voltage varying means comprises at least one of a Zener diode, diode, resistor and capacitor.

7. The apparatus of claim 5, wherein said voltage varying means for each one of said plurality of contacts is connected to ground when said pointer is positioned over said one of said plurality of contacts.

8. The apparatus of claim 2, wherein each of said voltage varying means is of a different value, said value corresponding to a unique reading of said dial.

9. The apparatus of claim 8, wherein the values of each of said voltage varying means are chosen such that the said coverting means will produce standard DTMF tones corresponding to the consumption indicated by each dial of said utility meter.

10. Apparatus for the remote reading of at least one dial of at least one utility meter of a subscriber using the subscriber's telephone communication line, comprising:
means connected to the telephone communication line of the subscriber for detecting the occurrence of a predetermined number of ring signals on the subscriber's line and for producing a first enabling signal indicative thereof;
means for receiving a plurality of tone signals and and for comparing a received tone to a predetermined tone signal; said means for receiving being connected in parallel across said subscriber's telephone communication line;
means for producing a second enabling signal upon receiving a predetermined tone;
means connected to receive said first and second enabling signals for actuating means for sequentially reading voltages corresponding to consumption recorded by said at least one utility meter;
means for transmitting said sequentially read voltages over said subscriber's telephone communication lines for receipt at a remote location; and
means for converting said sequentially read voltages to one of a plurality of standard DTMF tones, said means for converting comprising dot/bar display driver means coupled between said means for sequentially reading voltages and said means for transmitting.

11. The apparatus of claim 10, wherein said means for transmitting comprises DTMF tone encoding means connected between said dot/bar display driver means and said subscriber's telephone line.

12. Apparatus for the remote reading of at least one dial of at least one utility meter of a subscriber using the subscriber's telephone communication line, comprising:
means connected to the telephone communication line of the subscriber for detecting the occurrence of a predetermined number of rings on the subscriber's line and for producing a first enabling signal indicative thereof;
means for receiving a plurality of tone signals and for producing a second enabling signal upon receiving a predetermined tone; said means for receiving being connected in parallel across said subscriber's telephone communication line;
means connected to receive said first and second enabling signals for actuating means for sequentially reading voltages corresponding to consumption recorded by said at least one utility meter; and
means for transmitting each of said sequentially read plurality of voltages on said subscriber's telephone line to a central collection station, 13. Apparatus for the remote reading of at least one dial of at least one utility meter of a subscriber using the subscriber's telephone communication line, comprising:
means connected to the telephone communication line of the subscriber for detecting the occurrence of a predetermined number of rings on the subscriber's line and for producing a first enabling singal indicative thereof;
means for receiving a plurality of tone signals and for producing a second enabling signal upon receiving a predetermined tone; said means for receiving being connected in parallel across said subscriber's telephone communication line;
means connected to receive said first and second enabling signals for actuating means for sequentially reading voltages corresponding to consumption recorded by said at least one utility meter; and
means for transmitting each of said sequentially read plurality of voltages on said subscriber's telephone line to a central collection station,
wherein at least one of the sequentially read voltages represents an indication of whether said utility meter has been tampered with.

14. Apparatus for remotely reading at least one dial of at least one utility meter at a subscriber's location, using said subscriber's telephone line, comprising:
ring detector means connected to said subscriber's telephone line for counting the number of ring signals on said subscriber's telephone line;
tone detector means coupled to be activated by said ring detector means after said ring detector means reaches a predetermined count for connection to said subscriber's telephone line to detect a tone signal transmitted over said telephone line;
means for sequentially reading a plurality of voltages corresponding to the consumption recorded by said at least one utility meter, said means for sequentially reading being activated to begin the sequential reading upon said tone detector means receiving a predetermined tone signal;
means for transmitting each of said sequentially read plurality of voltages on said subscriber's telephone line to a central collection station;
said means for sequentially reading voltages comprising line decoder means having a discrete connection to each dial of the utility meter to be read; and
counter means for sequentially activating each of the discrete connections between said line decoder means and the respective dial of the utility meter to be read, wherein upon activation, the same predetermined voltage signal is applied through each discrete connection to each dial of said utility meter being read.

15. Apparatus for remotely reading at least one dial of at least one utility meter at a subscriber's location, using said subscriber's telephone line, comprising:
ring detector means connected to said subscriber's telephone line for counting the number of ring signals on said subscriber's telephone line;
tone detector means coupled to be activated by said ring detector means after said ring detector means reaches a predetermined count for connection to said subscriber's telephone line to detect a tone signal transmitted over said telephone line;
means for sequentially reading a plurality of voltages corresponding to the consumption recorded by said at least one utility meter, said means for sequentially reading being activated to begin the sequential reading upon said tone detector means receiving a predetermined tone signal;
means for transmitting each of said sequentially read plurality of voltages on said subscriber's telephone line to a central collection station; and
further comprising adapter means mounted to each utility meter to be read, said adapter means comrising:
a plurality of contacts associated with each dial of said utility meter;
each of said plurality of contacts associated with each dial being coupled to be sequentially read; and voltage varying means coupled between all but one of said plurality of contacts and said means for sequentially reading voltages, such that a voltage is generated for each dial of said utility meter.

16. The apparatus of claim 15, wherein said voltage generated for each dial corresponds to the consumption registered by said dial.

17. The apparatus of claim 15, wherein each dial includes a shaft and said adapter means mounts to said utility meter such that the shafts of each of the utility meter dials protrudes through holes surrounded by said plurality of contacts.

18. The apparatus of claim 17, wherein said adapter further comprises pointer means mounted to said dial shafts above said adapter means, said pointer means having means for connecting one of said plurality of contacts to ground when said pointer is positioned over said contact.

19. The apparatus of claim 15, wherein said voltage varying means comprises at least one of Zener diode, diode, resistor and capacitor.

20. The apparatus of claim 18, wherein said voltage varying means for each one of said plurality of contacts is connected to ground when said pointer means is positioned over said one of said plurality of contacts.

21. The apparatus of claim 15, wherein each of said voltage varying means is of a different value, said value corresponding to a unique reading of said dial.

22. The apparatus of claim 15, wherein the values of each of said voltage varying means are chosen such that the said encoding means will produce standard DTMF tones corresponding to the consumption indicated by each dial of said utility meter.

23. Apparatus for remotely reading at least one dial of at least one utility meter at a subscriber's location, using said subscriber's telephone line, comprising:
ring detector means connected to said subscriber's telephone line for counting the number of ring signals on said subscriber's telephone line;
tone detector means coupled to be activated by said ring detector means after said ring detector means reaches a predetermined count for connection to said subscriber's telephone line to detect a tone signal transmitted over said telephone line;
means for sequentially reading a plurality of voltages corresponding to the consumption recorded by said at least one utility meter, said means for sequentially reading being activated to begin the sequential reading upon said tone detector means receiving a predetermined tone signal;
means for transmitting each of said sequentially read plurality of voltages on said subscriber's telephone line to a central collection station; and
further including means for converting said sequentially read voltages to one of a plurality of standard DTMF tones, said means for converting comprising dot/bar display driver means coupled between said means for sequentially reading voltages and said means for transmitting.

24. The apparatus of claim 23, wherein said means for transmitting comprises DTMF tone encoding means connected between said dot/bar display driver means and said subscriber's telephone line.

25. Apparatus for remotely reading at least one dial of at least one utility meter at a subscriber's location, using said subscriber's telephone line, comprising:
ring detector means connected to said subscriber's telephone line for counting the number of ring signals on said subscriber's telephone line;
tone detector means coupled to be activated by said ring detector means after said ring detector means reaches a predetermined count for connection to said subscriber's telephone line to detect a tone signal transmitted over said telephone line;
means for sequentially reading a plurality of voltages corresponding to the consumption recorded by said at least one utility meter, said means for sequentially reading being activated to begin the sequential reading upon said tone detector means receiving a predetermined tone signal; and
means for transmitting each of said sequentially read plurality of voltages on said subscriber's telephone line to a central collection station,
wherein a plurality of the sequentially and voltages represent a unique identification of the subscriber.

26. Apparatus for remotely reading at least one dial of at least one utility meter at a subscriber's location, using said subscriber's telephone line, comprising:
ring detector means connected to said subscriber's telephone line for counting the number of ring signals on said subscriber's telephone line;
tone detector means coupled to be activated by said ring detector means after said ring detector means reaches a predetermined count for connection to said subscriber's telephone line to detect a tone signal transmitted over said telephone line;
means for sequentially reading a plurality of voltages corresponding to the consumption recorded by said at least one utility meter, said means for sequentially reading being activated to begin the sequential reading upon said tone detector means receiving a predetermined tone signal; and
means for transmitting each of said sequentially read plurality of voltages on said subscriber's telephone line to a central collection station,
wherein at least one of the sequentially read voltages represents an indication of whether said utility meter has been tapered with.

27. Apparatus for remotely reading at least one dial of at least one utility meter at subscriber's location, using said subscriber's telephone communication line, comprising:
ring detector means connected to said subscriber's telephone line for counting the number of ring signals on said subscriber's telephone line;
tone detector means coupled to be activated by said ring detector means after said ring detector means reaches a predetermined count for connection to said subscriber's telephone line to detect a tone signal transmitted over said telephone line;
adapter means mounted to each utility meter to be read, said adapter means comprising:
a plurality of contacts associated with each dial of said utility meter;
each of said plurality of contacts associated with each dial being coupled to be sequentially read; and
voltage varying means coupled between all but one of said plurality of contacts and means for sequentially reading voltages, such that a voaltage is generated for each dial of said utility meter;
means for sequentially reading a plurality of voltages corresponding to the consumption recorded by said at least one utility meter, said means for sequentially reading being activated to begin the sequential reading upon said tone detector means receiving a predetermined tone signal; and means for transmitting each of said sequentially read plurality of voltages on said subscriber's telephone line to a central collection station.

28. The apparatus of claim 27, wherein said voltage generated for each dial corresponds to the consumption registered by said dial.

29. The apparatus of claim 27, wherein said adapter means mounts to said utility meter such that the shafts of the utility meter dials protrude through holes surrounded by said plurality of contacts.

30. The apparatus of claim 29, wherein said adapter further comprises pointer means mounted to said dial shafts above said adapter means, said pointer means having means for connecting one of said plurality of contacts to ground when said pointer is positioned over said contact.

31. The apparatus of claim 27, wherein said voltage varying means comprises at least one of a Zener diode, diode, resistor and capacitor.

32. The apparatus of claim 30, wherein said voltage varying means for each one of said plurality of contacts is connected to ground when said pointer means is positioned over said one of said plurality of contacts.

33. The apparatus of claim 27, wherein each of said voltage varying means is of a different value, said value corresponding to a unique reading of said dial.

34. The apparatus of claim 27, wherein the values of each of said voltage varying means are chosen such that the said converting means will produce standard DTMF tones corresponding to the consumption indicated by each dial of said utility meter.

35. The apparatus of claim 27, further including means for converting said sequentially read voltages to one of a plurality of standard DTMF tones, said means for converting comprising dot/bar display driver means coupled between said means for sequentially reading voltages and said means for transmitting.

36. The apparatus of claim 35, wherein said means for transmitting comprises DTMF tone encoding means connected between said dot/bar display driver means and said subscriber's telephone line.

37. The apparatus of claim 35, wherein a plurality of the sequentially read voltages represent a unique indentification of the subscriber.

38. The apparatus of claim 27, wherein at least one of the sequentially read voltages represents an indication of whether said utility meter has been tampered with.

39. The apparatus of claim 27, wherein said means for receiving a plurality of tone signals is capable of distinguishing between each of said plurality of tones such that each of said plurality of tone signals can be used to address an interrogation of a unique plurality of subscribers.

40. The apparatus of claim 27, wherein said means for sequentially reading voltages comprises line decoder means having a discrete connection to each dial of the utility meter to be read.

41. The apparatus of claim 40, further including counter means for sequentially activating each of the discrete connections between said line decoder means and the respective dial of the utility meter to be read.

42. The apparatus of claim 41, wherein upon activation, the same predetermined voltage signal is applied through each discrete connection to each dial of said utility meter being read.

43. Apparatus for the remote reading of at least one utility meter of a subscriber using the subscriber's telephone communication line, comprising:

means connected to the telephone communication line of the subscriber for detecting the occurrence of a predetermined number of ring signals on the subscriber's line and for producing a first enabling signal indicative thereof;

means for receiving a plurality of tone signals and for comparing a received signal to a predetermined tone signal; said means for receiving being connected in parallel across said subscriber's telephone communication line;

means for producing a second enabling signal upon determining that a predetermined tone signal was received;

means for generating a signal corresponding to the consumption recorded by said at least one utility meter; and means connected to receive said first and second enabling signals for actuating means for transmitting said generated signal corresponding to consumption recorded by said at least one utility meter over said subscriber's telephone communication line for receipt at a remote location, wherein a signal is generated which represents an indication of whether said utility meter has been tampered with.

44. Apparatus for remotely reading at least one utility meter at a subscriber's location, using said subscriber's telephone line, comprising:

ring detector means connected to said subscriber's telephone line for counting the number of ring signals on said subscriber's telephone line;

tone detector means coupled to be activated by said ring detector means after said ring detector means reaches a predetermined count for connection to said subscriber's telephone line to detect a tone signal transmitted over said telephone line;

means for generating a signal corresponding to the consumption recorded by said at least one utility meter, said means for generating being activated to begin transmitting the consumption signal upon said tone detector means receiving a predetermined tone signal; and means for transmitting said consumption signal on said subscriber's telephone line to a central collection station, wherein a signal is generated which represents an indication of whether said utility meter has been tampered with.

* * * * *